United States Patent
Martynowicz et al.

(10) Patent No.: US 7,172,639 B2
(45) Date of Patent: Feb. 6, 2007

(54) APPARATUS FOR PREPARING PURE CARBON DIOXIDE ($CO_2$) FROM A GASEOUS CARBON DIOXIDE CONTAINING PRODUCT

(75) Inventors: Emile Thomas Martinus Johannes Martynowicz, Venlo (NL); Nicolaas Den Heijer, Wychen (NL); Menno Martijn Holterman, Venlo (NL)

(73) Assignee: Haffmans B.V., Venlo (NL)

( * ) Notice: Subject to any disclaimer, the term of this patent is extended or adjusted under 35 U.S.C. 154(b) by 0 days.

(21) Appl. No.: 10/485,546
(22) PCT Filed: Jul. 8, 2002
(86) PCT No.: PCT/NL02/00445

§ 371 (c)(1),
(2), (4) Date: Apr. 29, 2004

(87) PCT Pub. No.: WO03/011757

PCT Pub. Date: Feb. 13, 2003

(65) Prior Publication Data

US 2004/0250682 A1 Dec. 16, 2004

(30) Foreign Application Priority Data

Aug. 3, 2001 (NL) .................................. 1018708

(51) Int. Cl.
*B01D 50/00* (2006.01)
(52) U.S. Cl. ..................... 55/315; 55/467; 96/142; 96/306; 96/355
(58) Field of Classification Search .............. 96/142, 96/301, 306, 355; 95/39, 41, 42; 55/315, 55/467; 418/85, DIG. 1
See application file for complete search history.

(56) References Cited

U.S. PATENT DOCUMENTS 4,968,231 A * 11/1990 Zimmern et al. ............ 418/1
6,085,549 A * 7/2000 Daus et al. .................. 62/624

FOREIGN PATENT DOCUMENTS

| EP | 0 194 795 A | 9/1986 |
| EP | 0 646 756 A | 4/1995 |
| EP | 0 964 215 A | 12/1999 |

OTHER PUBLICATIONS

Patent Abstracts of Japan, vol. 1999, No. 5, May 31, 1999, Abstract only.

* cited by examiner

*Primary Examiner*—Robert Hopkins
(74) *Attorney, Agent, or Firm*—Foley & Lardner LLP

(57) ABSTRACT

The invention relates to an apparatus for preparing pure carbon dioxide ($CO_2$) from a gaseous $CO_2$ containing product, which apparatus comprises a processing line which comprises at least an inlet for the gaseous product, means for removing water-soluble impurities from the product, compression means for compressing and pressurising the product, cleaning means for removing further impurities from the product, as well as storage means for collecting and storing the purified $CO_2$, which elements are interconnected by means of suitable piping. According to the invention, the compression means comprise at least one screw compressor so as to provide an apparatus for preparing pure carbon dioxide from a gaseous $CO_2$ containing product which has a higher efficiency, which is of simpler, cheaper construction and which is easy to maintain.

13 Claims, 3 Drawing Sheets

APPARATUS FOR PREPARING PURE CARBON DIOXIDE ($CO_2$) FROM A GASEOUS CARBON DIOXIDE CONTAINING PRODUCT

FIELD OF THE INVENTION

The invention relates to an apparatus for preparing pure carbon dioxide ($CO_2$) from a gaseous $CO_2$ containing product, which apparatus comprises a processing line comprising at least an inlet for the gaseous product, means for removing water-soluble impurities from the product, compression means for compressing and pressurising the product, cleaning means for removing further impurities from the product, as well as storage means for collecting and storing the purified $CO_2$, which elements are interconnected by means of suitable piping.

BACKGROUND OF THE INVENTION

Such an apparatus is known, for example from European patent no. EP-B-0 646 756 granted to the present applicant. During the preparation process of beverages, in which fermentation processes take place, such as the brewing of beer and the like, a considerable amount of gas is released in the form of carbon dioxide ($CO_2$).

Because in particular a beer brewer needs $CO_2$ for filling the brewed beer into containers, rinsing out piping, etc., and because in addition to that the gas that has been released during the brewing process is currently being used, after being collected and purified, for producing carbonated (soft) drinks, the gas is not blown off but collected and purified.

To this end, an apparatus or a $CO_2$ recovery plant in accordance with the introduction and as disclosed in, for example, EP-B-0 646 756 is used. The $CO_2$-containing gas is caught by means of said known plant and all kinds of components, such as the organic and sulphurous components produced during the fermentation process, air and foam, water, etc. are removed therefrom in a number of processing steps until carbon dioxide having a high degree of purity is obtained.

Another application of such an apparatus is the winning of pure $CO_2$ from, for example, process gas from the chemical industry, natural sources, etc.

SUMMARY OF THE INVENTION

The main component of the $CO_2$ recovery apparatus is formed by the compression means, which currently consist of non-lubricated piston compressors. The drawbacks of the use of piston compressors in the current apparatus include in particular their overall dimensions, as well as their weight in relation to the other components of the recovery plant. Since it is not possible to use oil-lubricated piston compressors for preparing pure "food-grade" carbon dioxide, non-lubricated piston compressors are used. Partly because of the multitude of moving parts it comprises, this type of piston compressor requires a great deal of maintenance, whilst it is furthermore characterized by a higher failure rate.

An apparatus is provided for the preparation of pure carbon dioxide from a gaseous $CO_2$ containing product which does not exhibit the aforesaid drawbacks. The apparatus according to the invention is characterized in that the compression means comprise at least one screw compressor. The use of a screw compressor instead of a piston compressor in a $CO_2$ recovery plant has a number of advantages, in particular its greater efficiency compared with the piston compressors that are currently being used. In addition to that, the screw compressor is characterized by its compact construction, both as regards its weight and as regards its dimensions, whilst it comprises fewer moving parts, which reduces the risk of malfunction and failure.

A special embodiment of the apparatus according to the present invention is characterized in that the screw compressor is a water-cooled screw compressor. As a result, the moving parts are not only cooled but also "lubricated" by a medium which is not harmful to the final product and to the consumer in such a "food-grade" application.

According to the invention, separating means may be arranged directly after the screw compressor for separating the water from the compressed product, wherein the water outlet of the separating means may be connected to the water inlet of the water-cooled screw compressor. This embodiment has the additional advantage that the means for removing water-insoluble impurities from the product can thus form part of the water separating means of the screw compressor. As a result, a lower-cost apparatus of even more compact construction is obtained, since two essential parts of the apparatus can now be integrated with each other.

In a specific embodiment of the apparatus according to the invention, the separating means comprise a cyclone.

In order to realise a more effective manner of pressurising the gaseous $CO_2$-containing product, the compression means comprise two screw compressors which are arranged in series, wherein one driving means may be used for driving the two screw compressors. Said driving means may drive the screw compressors by means of one belt transmission or by means of separate belt transmissions.

By gearing the two screw compressors to each other via the driving means during operation, a two-stage compression stroke can be obtained, by means of which the $CO_2$-containing gaseous product can be compressed to a high pressure, which is highly desirable in connection with the purification steps further down the apparatus. In particular the efficiency of the apparatus and as well as the yield of pure $CO_2$ can thus be enhanced significantly.

BRIEF DESCRIPTION OF THE DRAWINGS

The invention will now be explained in more detail with reference to a drawing, in which.

For the sake of clarity, like parts are indicated by the same numerals in the various figures.

DETAILED DESCRIPTION OF THE INVENTION

Figure 1:
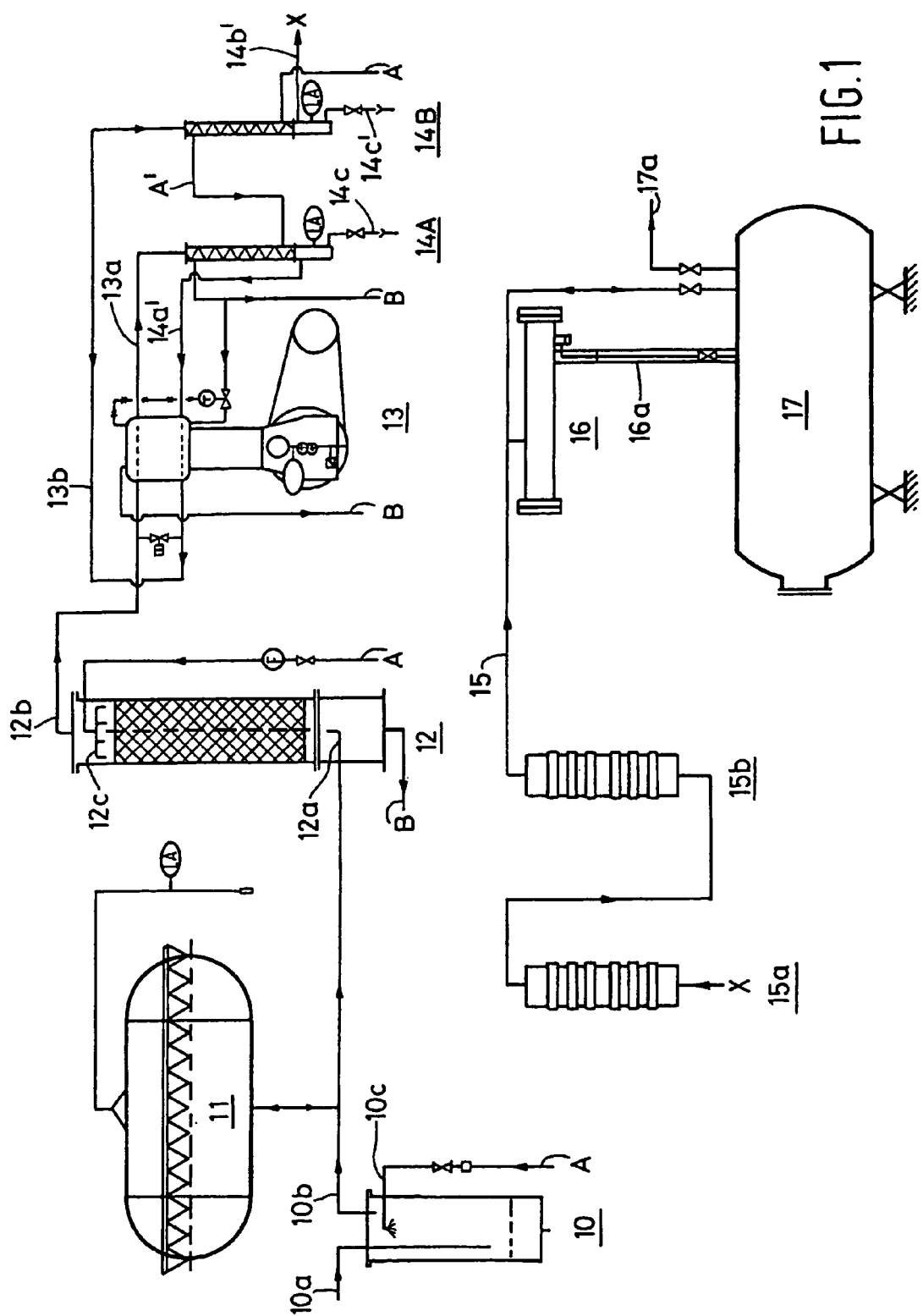
FIG. 1 shows an overall diagram of an apparatus according to the prior art.

FIG. 1 schematically shows an apparatus for recovering $CO_2$ from a gaseous $CO_2$-containing product. Said gaseous $CO_2$-containing product is generally a gas or gases released in the course of a beer-brewing process. Said gas contains all kinds of components which must be removed in order to obtain "food-grade" carbon dioxide as the final product. Said "food-grade" carbon dioxide can be used for filling bottles with beer or for producing and bottling (soft) drinks. The reason why the purified carbon dioxide must have the "food-grade" classification is that, in addition to $CO_2$, also all kinds of other fermentation components, such as various alcohols as well as organic and sulphurous components are produced during the process of brewing beer. Said components and aromas influence the taste and the smell of the final product which are treated with the $CO_2$. Consequently, it is desirable to obtain $CO_2$ having the highest degree of purity.

The gas that is obtained during the brewing process is passed through a so-called foam trap via the pipe 10a. The foam that has likewise been produced during the fermentation process must first be removed from the gas, because the foam, which mainly consists of air, may damage certain mechanical, usually moving parts (such as valves, and also the screw compressor) further down the apparatus. The gas is led into the foam trap 10 at the bottom via the pipe 10a, after which water or atomized moisture is sprayed into the foam trap via the pipe 10c. This makes it possible to discharge the foam, whilst defoamed gas can be stored in the storage tank 11 via the pipe 10b, which storage tank functions as a buffer for creating a stable volume flow of carbon dioxide through the apparatus.

The defoamed gas is introduced into a so-called gas washing or rinsing device 12 via the pipe 12a, wherein the alcohols and other water-soluble components are rinsed or washed out of the $CO_2$ flow by means of water according to the so-called counterflow principle, which water from the inlet A is sprayed into the gas washing installation 12 from above by the spray nozzles 12c. The rinsing water and the alcohols and other soluble components dissolved therein are collected at the bottom of the gas washing installation 12 and discharged via the pipe B. The "washed" $CO_2$ flow leaves the gas washing installation 12 via the pipe 12b and is carried to the compression means 13 which, in accordance with the prior art, is in the form of a non-lubricated piston compressor.

Since the working pressure of the apparatus is usually 18 bar, the piston compressor operates in two stages, wherein the $CO_2$ is compressed to about 3.5 bar in the first stage and to the required process pressure of 18 bar in the second stage. Preferably, compression takes place in two stages so as to prevent the temperature of the gas in the compressor 13 running up too high. If the gas temperature is too high, damage to the moving parts may occur. To this end, the gas is compressed to about 3.5 bar in the first compression stage and introduced into an intercooler 14a via the pipe 13a. After cooling has taken place, the $CO_2$ can be carried to the second stage via the pipe 14a', in which it is further compressed to the required process pressure of 18 bar.

The water (from the gas washing installation 12) that may be present in the gas can be separated in the form of condensate at the first compression stage via the discharge pipe 14c. Also after the second compression stage, the $CO_2$ is introduced into a second condenser 14b via the pipe 13b, in which condenser further cooling of the gas takes place and condensate that has remained behind can be discharged via the discharge pipe 14c'. The cooling medium that is required for the intercoolers or condensers 14a and 14b is supplied via the cooling pipe A, A' and discharged via the return pipes B.

After the compression stroke, the $CO_2$ flow is passed through first filter means, preferably an active carbon filter 15a, under a process pressure of 18 bar. The active carbon in said filter means 15a absorbs the impurities from the $CO_2$ flow that are not soluble in water. Said impurities may be all kinds of gaseous sulphur components, for example. After the active carbon filter 15a, the purified $CO_2$ flow is passed through second filter means 15b in order for the moisture that may still be present in the $CO_2$ to be removed. This is necessary because the dew point of the $CO_2$ flow is still too high to enable condensation of moisture that is still present. By passing the $CO_2$ flow through a filter 15b containing a drying agent, the dew point of the $CO_2$ flow is lowered to a value below $-64°$ C., so that the moisture which is present will condense and be absorbed in the filter.

It will be understood that the two filter means 15a and 15b will become saturated in the course of time, so that the flow must be diverted to new filters 15a and 15b, respectively, is necessary. To that end, a second line comprising series-arranged filter means 15a' and 15b' (not shown) is incorporated in the apparatus parallel to the series-arranged filter means 15a and 15b, to which the $CO_2$ flow can be led the moment the first filter line (15a and 15b) has become saturated and must be shut down in order to be cleaned. The switch from the first line 15a and 15b to the second filter line 15a' and 15b' (not shown) takes place every 12 hours, for example, so that the $CO_2$ recovery plant can be operated continuously.

In a particular application of the recovery plant, the substantially pure $CO_2$ flow is then led to a condenser 16 via the pipe 15, in which condenser the $CO_2$ flow is cooled down to a temperature below $-24°$ C. by means of a cooling coil, through which a cooling medium (not shown) flows. The fact is that said temperature constitutes the dew point of carbon dioxide with a process pressure of 17.5 bar. The $CO_2$ that condenses in the condenser will collect at the bottom of the condenser 16 and flow to the storage tank 17 via the intermediate pipe 16a under the influence of the force of gravity.

Although this is not shown in FIG. 1, the storage tank 17 may furthermore comprise means which heat the liquid $CO_2$, as a result of which the $CO_2$ is purified in the intermediate pipe 16a, in particular if said intermediate pipe is provided with a gasket. The impure gaseous $CO_2$ may be used as a so-called "purging" gas for regenerating or cleaning the active carbon filters and the drying filters (15a, 15b and 15a', 15b' respectively) in the first and the second filter line. The degree of purity of the liquid $CO_2$ is now very high, and after storage in the tank 17 the $CO_2$ is carried off, via pipe 17a, for further processing, for example for filling beer bottles or for bottling carbonated (soft) drinks. This very pure $CO_2$ has the "food-grade" classification.

One of the drawbacks of the use of a piston compressor 13 in the prior art $CO_2$ recovery plant is the fact that it takes up a considerable amount of space. In addition to that, a non-lubricated piston compressor must be used at all times, because the use of an oil-lubricated piston compressor for obtaining pure "food-grade" $CO_2$ is out of the question. Said piston compressor is furthermore sensitive to the presence of water in the gaseous product to be compressed, because the water might cause irreparable damage to the moving parts of the piston compressor at the pressures that prevail therein. In addition to that, a piston compressor is characterized by a large number of moving parts, which require maintenance, whilst furthermore its efficiency is relatively low.

It has turned out that it is possible to obtain a much better performance by using a so-called screw compressor instead of a piston compressor. When a screw compressor is used as the compression means in accordance with the invention, not only a more compact installation is obtained, but above all a screw compressor which distinguishes itself from the known piston compressors by a higher efficiency and a smaller number of moving parts. In particular the latter fact means a significant simplification as regards maintenance, whilst also the risk of malfunctions is reduced.

Since a screw compressor is smaller than the usual piston compressor, both as regards its dimensions and as regards its weight, it is possible to exchange the screw compressor for another screw compressor in its entirety in the case of maintenance, so that any maintenance that may be required need not be done on-site. The duration of a possible shutdown of the $CO_2$ recovery plant is thus reduced to a short period, and the quick exchange of the screw compressor enables a quick restart of the apparatus. Although it is possible in accordance with the invention to use a non-lubricated screw compressor, in which the screw rotors rotate freely in the pump housing, in an apparatus according to the invention, this has the drawback that cooling cannot take place and that consequently the process temperature of the $CO_2$ flow may increase considerably. In addition to that, only small compression ratios are possible with a non-lubricated screw compressor. In order to compress the $CO_2$ to the desired process pressure of 18 bar, cooling of the screw compressor is necessary, and it has turned out that the injection of water into the $CO_2$ flow can provide the desired cooling effect. Because the water content of the $CO_2$ flow increases considerably as a result of the injection of water on the inlet side of the screw compressor, it is necessary to separate the water from the $CO_2$ flow after the compression stage.

Figure 2:
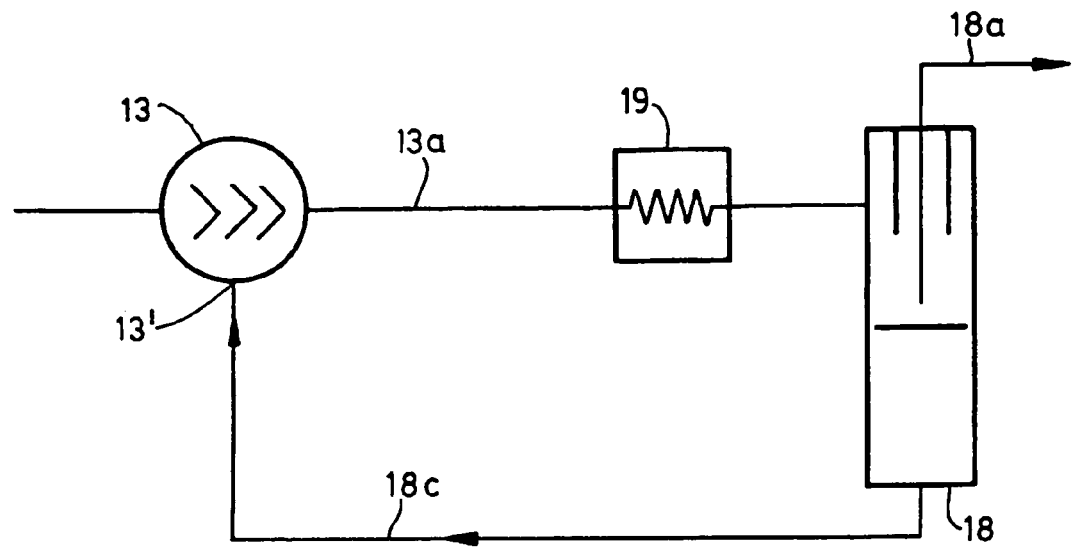
FIG. 2 shows one aspect of the apparatus according to the invention.

FIG. 2 schematically shows the compression part of the $CO_2$ recovery plant according to the invention, in which water separating means 18 are arranged after the screw compressor 13. Preferably, said separating means 18 are in the form of a cyclone. The separated water can be reused very effectively by returning it to the inlet side 13' of the screw compressor 13. The advantage of returning the separated water on the inlet side of the screw compressor, via the pipe 18c, is moreover that any water-soluble components (such as alcohols etc) that may be present in the $CO_2$ flow will be dissolved in the injected water. This enables a much smaller construction of the means for removing water-insoluble impurities from the product, in this case the gas washing installation which is indicated at 12 in FIG. 1, which in turn means lower installation costs.

On the other hand, the gas washing installation 12 can be left out altogether in that the gas washing installation 12 can be fully incorporated in the water separating and returning means 18–18c of the screw compressor 13. Furthermore it has turned out that a screw compressor is not adversely affected by the compressing and pumping of water-containing $CO_2$. This in contrast to the piston compressor that has been used so far, which is only capable of compressing "dry" $CO_2$, since the piston compressor will otherwise be confronted with a so-called water hammer due to the possible presence of condensed water, which may cause considerable damage to the moving parts. In order to compensate for any temperature increase of the $CO_2$ flow after the first compression stroke, a cooler 19 may be fitted in the outlet pipe 13a.

Analogously to FIG. 1, the compression of the $CO_2$ flow by means of the screw compressor is carried out in two stages, in which two series-arranged screw compressors are used in the process line. In the case of water-injected screw compressors, each compression stage will consist of a screw compressor 13 as well as water separating and returning means 18–18c, for example in the form of a cyclone. The screw compressor of the second compression stage is fed with the compressed $CO_2$ flow, which leaves the water separating means 18 via the pipe 18a. The dissolution of water-insoluble components can be enhanced by returning the separated water to the inlet side of the screw compressor in question in each compression stage and thus injecting it again, so that the gas washing installation 12 (see FIG. 1) can be left out altogether. The two compression stages, each comprising a water separating device 18, also function as a gas washing installation in that case.

Figure 3:
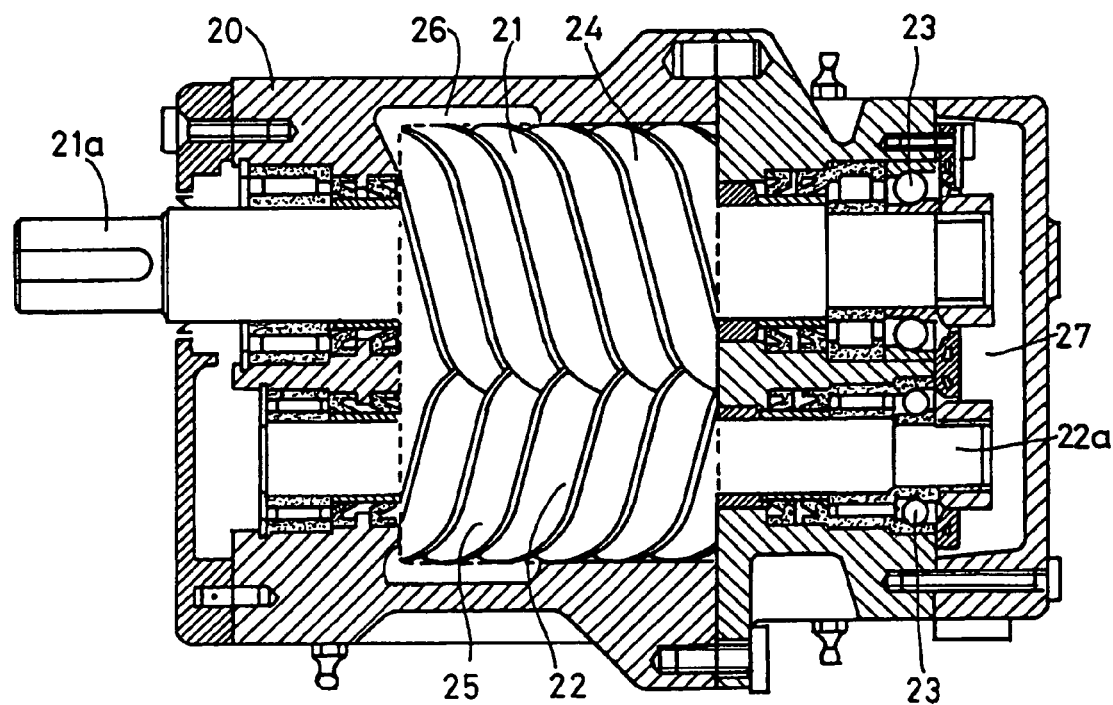
FIG. 3 is an exploded view of a screw compressor for use in an apparatus according to the invention.
Figure 4A:
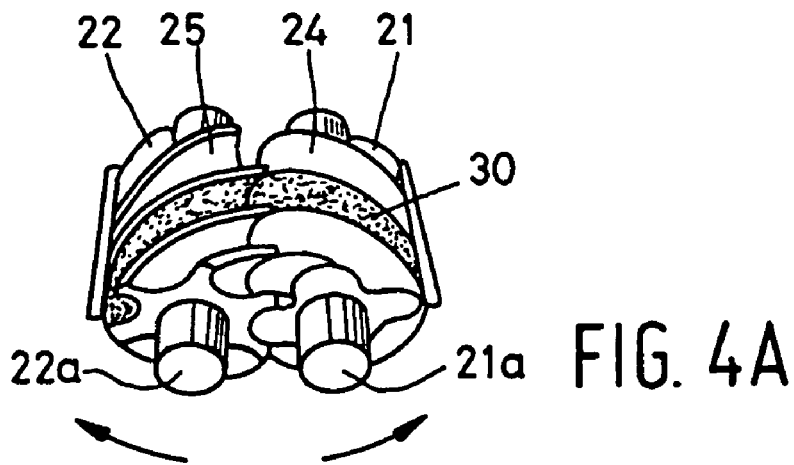
FIGS. 4a–4c are further views of a screw compressor for use in an apparatus according to the invention.
Figure 4B:
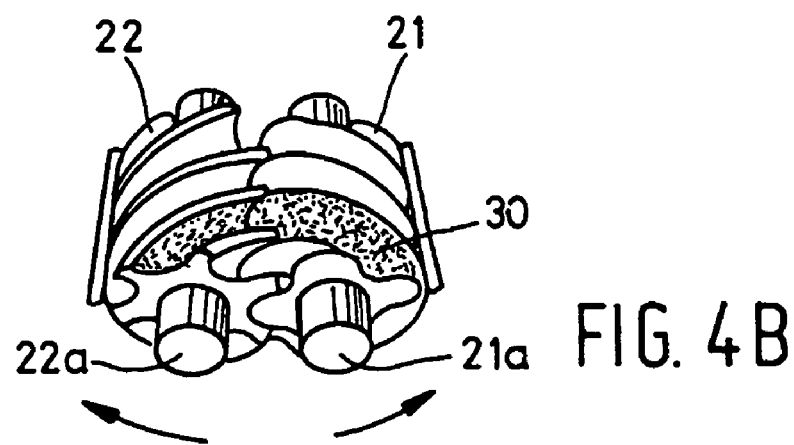
Figure 4C:
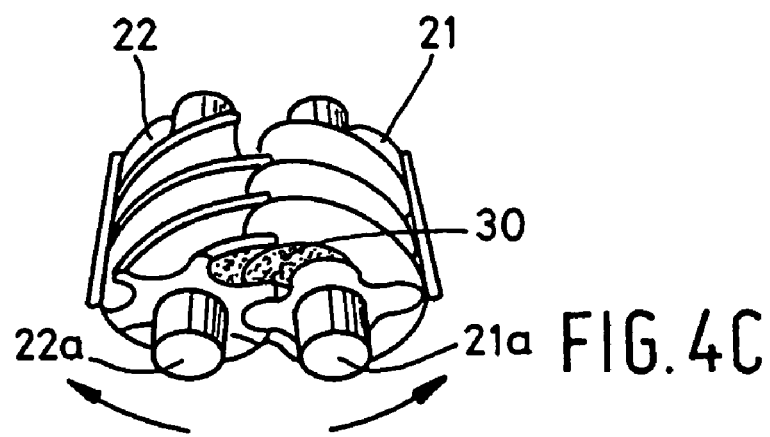

The screw compressor as shown in FIG. 3, which forms one of the two compression stages of the compression means of the apparatus according to the invention, has a housing 20 fitted with two screw rotors 21 and 22. The two screw rotors 21 and 22 are mounted on rotor shafts 21a and 22a respectively, which are mounted in the housing 20 by means of suitable bearings 23 (ball bearings, for example). The rotor shaft 21a is connected to driving means (not shown) in that case, so that both screw rotors 21 and 22 can be rotatably driven via the shaft 21a. The helical groove 24 of the screw rotor 21, together with the corresponding groove 25 of the other screw rotor 22, forms the compression chamber, as is clearly shown also in FIGS. 4A–4C. The compression chamber, which is indicated by the hatched portion 30 in FIGS. 4A–4C, has a variable volume V, which will initially increase to the situation that is shown in FIG. 4A as a result of the rotation of the two screw rotors 21 and 22. The chamber volume V formed by the compression chamber 30 then increases from 0 to a maximum value in that case, see FIG. 4A, in which situation the compression chamber 30 is in communication with the inlet port 26 (see FIG. 3) in the wall of the compressor housing 20. The $CO_2$ flows into the compression chamber 30 at a nearly constant pressure in that situation.

As a result of the shape of the compressor housing 20, the compression chamber 30 will be shut off upon reaching its maximum volume V during the compression phase. The rotation of the screw rotors 21 and 22 via the rotor shaft 21a has progressed so far by now that the compression chamber 30 that has been formed is no longer in communication with the inlet side 26. Further rotation of the screw rotors 21 and 22 will cause the compression volume V of the compression chamber 30 to decrease (see FIG. 4B). The compression causes the outlet opening at the rear side of the screw compressor to be opened as a result of the presence of an overpressure. The outlet opening on the high-pressure side of the screw compressor is indicated at 27 in FIG. 3.

The reduction in volume from a maximum volume of the compression chamber 30 just before the inlet opening 26 closes to the volume at the end of the compression stroke just before the outlet opening 27 opens is called the compression ratio of the screw compressor. When the outlet port 27 opens, the compressed $CO_2$ is displaced to the pressure pipe, indicated at 13a in FIGS. 1 and 2 and at 13b in the second compression stage, whilst the pressure remains practically the same.

When a suitable screw compressor is used, the volume V of the compression chamber 30 has been reduced to ⅕ of its volume at the end of the compression stroke. Because several grooves of the screw rotors 21 and 22 mate in succession, thus forming successive compression chambers 30 (at various stages of the compression cycle), the compressed gas flow is hardly interrupted.

In order to obtain the desired process pressure of 18 bar, the two screw compressors must be geared to each other as regards the volume ratio and the volume flow. This is achieved in part by driving the two screw compressors with a suitable number of revolutions. Preferably, the screw compressors are driven simultaneously by driving means so as to obtain compression values which are precisely geared to each other. The compressors may be driven via a belt transmission, for example, wherein the number of revolutions for each screw compressor can be set to achieve the most effective operational conditions by selecting a different transmission ratio.

Although the $CO_2$ recovery plant according to the invention as described above comprises two compression stages, it is also possible to use only one screw compressor having the compression ratio that is required to achieve the final pressure of the gaseous product, for example a compression ratio of 1:18 or 1:20.

Furthermore it should be noted that the $CO_2$ recovery plant according to the invention has been described above as an apparatus for recovering $CO_2$ from a $CO_2$-containing gaseous product which has been released in the course of a beer brewing process. The apparatus according to the invention can also be used in other processes in which carbon dioxide is released, however, for example in the fermentation of wine or other beverages obtained on the basis of fermentation processes, as well as in the industrial recovery of $CO_2$ from process gas and the recovery of $CO_2$ from natural sources, such as air.

Netherlands Priority Application 1018708, filed Aug. 3, 2001 including the specification, drawings, claims and abstract, is incorporated herein by reference in its entirety.

The invention claimed is:

1. An apparatus for preparing pure carbon dioxide ($CO_2$) from a gaseous $CO_2$ containing product, which apparatus comprises a processing line which comprises:
   an inlet for the gaseous product;
   means for removing water-soluble impurities from the product;
   compression means for compressing and pressurizing the product, said compression means comprising at least one water-cooled screw compressor;
   separating means arranged directly after the screw compressor for separating water from the compressed product
   cleaning means for removing further impurities from the product, and
   storage means for collecting and storing the purified $CO_2$,
   wherein said elements are interconnected by means of suitable piping, and
   wherein the means for removing water-insoluble impurities from the product form part of the water separating means of the screw compressor.

2. The apparatus according to claim 1, wherein a water outlet of the separating means is connected to a water inlet of the water-cooled screw compressor.

3. An apparatus for preparing pure carbon dioxide ($CO_2$) from a gaseous $CO_2$ containing product, which apparatus comprises a processing line which comprises:
   an inlet for the gaseous product;
   means for removing water-soluble impurities from the product;
   compression means for compressing and pressurizing the product;
   cleaning means for removing further impurities from the product, and
   storage means for collecting and storing the purified $CO_2$,
   wherein said elements are interconnected by means of suitable piping, and
   wherein the compression means comprise two screw compressors which are arranged in series.

4. The apparatus according to claim 3, wherein one driving means is used for driving the two screw compressors.

5. The apparatus according to claim 4, wherein the driving means drive the screw compressors by means of one belt transmission.

6. The apparatus according to claim 4, wherein the driving means drive the screw compressors by means of separate belt transmissions.

7. The apparatus according to claim 3, further comprising:
   a separating unit arranged directly after the compression means for removing water from the compressed product,
   wherein a water outlet of the separating unit is connected to a water inlet of the compression means.

8. An apparatus for preparing pure carbon dioxide ($CO_2$) from a gaseous $CO_2$ containing product, which apparatus comprises a processing line which comprises:
   an inlet for the gaseous product;
   means for removing water-soluble impurities from the product;
   compression means for compressing and pressurizing the product, said compression means comprising at least one water-cooled screw compressor;
   separating means arranged directly after the screw compressor for separating water from the compressed product
   cleaning means for removing further impurities from the product, and
   storage means for collecting and storing the purified $CO_2$,
   where in said elements are interconnected by means of suitable piping,
   wherein a water outlet of the separating means is connected to a water inlet of the water-cooled screw compressor,
   wherein the means for removing water-insoluble impurities from the product form part of the water separating means of the screw compressor.

9. The apparatus according to claim 8, wherein the separating means comprise a cyclone.

10. An apparatus for preparing pure carbon dioxide ($CO_2$) from a gaseous $CO_2$ containing product, which apparatus comprises a processing line which comprises:
    an inlet for the gaseous product;
    means for removing water-soluble impurities from the product;
    compression means for compressing and pressurizing the product, said compression means comprising at least one water-cooled screw compressor;
    separating means arranged directly after the screw compressor for separating water from the compressed product
    cleaning means for removing further impurities from the product, and
    storage means for collecting and storing the purified $CO_2$,
    wherein said elements are interconnected by means of suitable piping,
    wherein a water outlet of the separating means is connected to a water inlet of the water-cooled screw compressor,
    wherein the compression means comprise two screw compressors which are arranged in series.

11. The apparatus according to claim 10, wherein one driving means is used for driving the two screw compressors.

12. The apparatus according to claim 11, wherein the driving means drive the screw compressors by means of one belt transmission.

13. The apparatus according to claim 11, wherein the driving means drive the screw compressors by means of separate belt transmissions.

* * * * *